(12) United States Patent
Czarnecki

(10) Patent No.: US 6,534,735 B1
(45) Date of Patent: Mar. 18, 2003

(54) COVER ASSEMBLY FOR A TRANSFER SWITCH

(75) Inventor: Neil A. Czarnecki, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 0 days.

(21) Appl. No.: 09/912,828

(22) Filed: Jul. 25, 2001

(51) Int. Cl.$^7$ ................................................. H01H 9/00
(52) U.S. Cl. ..................... 200/333; 200/308; 200/293; 200/43.22
(58) Field of Search ........................ 200/43.01, 43.16, 200/43.19, 43.22, 293–297, 308, 333, 334; 361/602, 627, 628, 631, 641, 643, 657, 658, 837

(56) References Cited

U.S. PATENT DOCUMENTS

| | | | | |
|---|---|---|---|---|
| 5,157,577 A | * | 10/1992 | Balaud et al. ............ | 200/43.22 |
| 5,341,273 A | * | 8/1994 | Sharp et al. ................ | 361/641 |
| 5,486,664 A | * | 1/1996 | Lamp et al. ................ | 200/297 |
| 5,568,362 A | * | 10/1996 | Hansson ..................... | 361/827 |
| 5,761,027 A | * | 6/1998 | Flegel ........................ | 361/664 |
| 6,373,004 B1 | * | 4/2002 | Jackson ...................... | 200/331 |

* cited by examiner

Primary Examiner—Michael Friedhofer
(74) Attorney, Agent, or Firm—Andrus, Sceales, Starke & Sawall, LLP

(57) ABSTRACT

A power transfer arrangement is provided for supplying power from a generator the electrical system of a building. The power transfer arrangement includes a power transfer switching mechanism adapted for interconnection with the building electrical system. The power transfer switching mechanism includes a cabinet having panel structure provided with various electrical components for transferring power to various load circuits. A transparent cover assembly is movably mounted to the cabinet for selectively preventing and permitting access to the electrical component and the front panel while simultaneously allowing constant visual monitoring of the components of the panel structure.

9 Claims, 3 Drawing Sheets

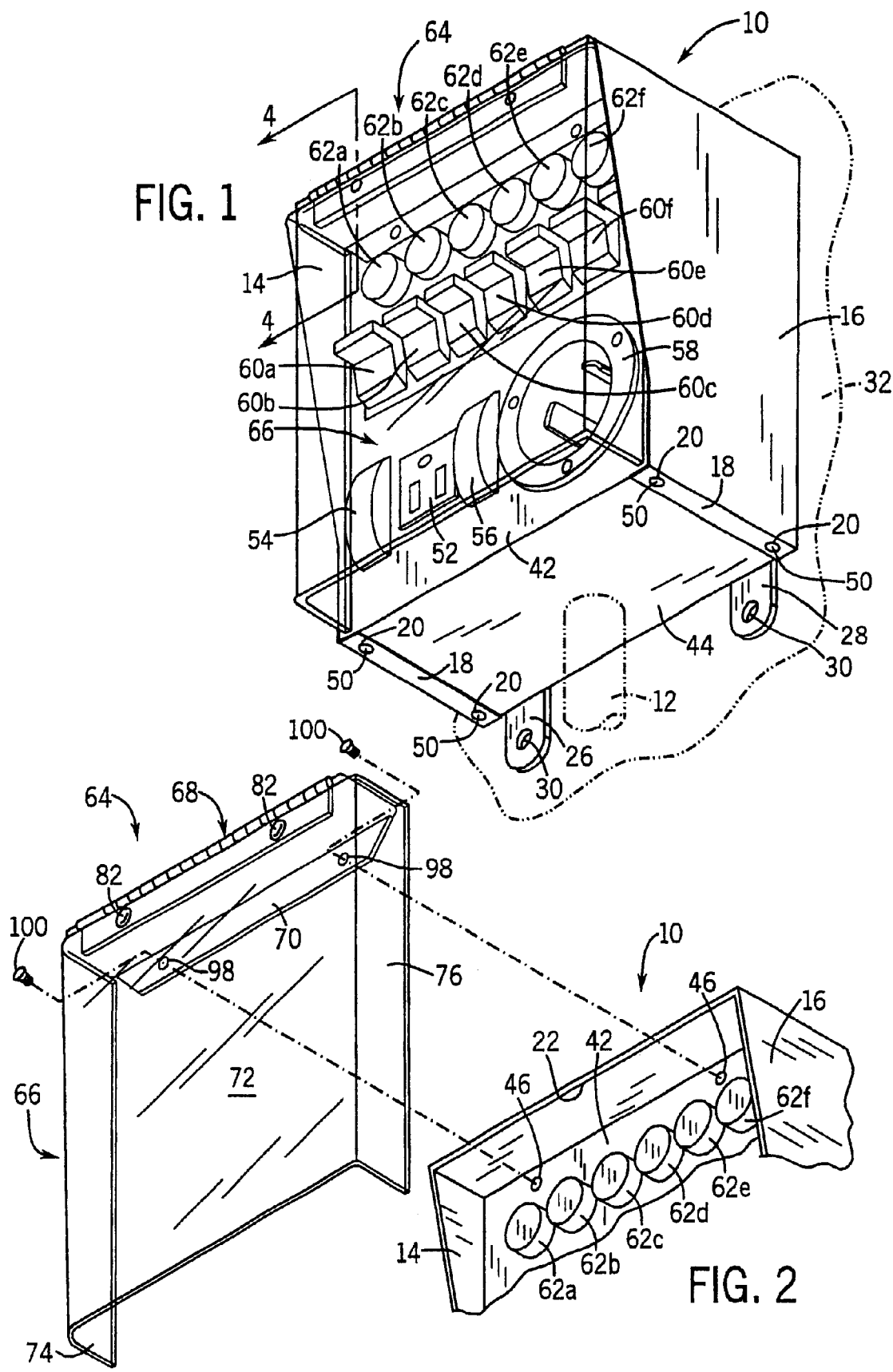

COVER ASSEMBLY FOR A TRANSFER SWITCH

FIELD OF THE INVENTION

This invention relates to a power transfer arrangement for providing power to the electrical system of a building, such as power supplied from a standby generator, and more particularly, pertains to a power transfer arrangement provided with a protective cover assembly.

BACKGROUND AND SUMMARY OF THE INVENTION

Portable generators may be used in certain situations to feed electrical power to residential and commercial load circuits during a utility power outage. These systems in their most basic form include a generator or other auxiliary source of power positioned exteriorly of a building. The generator is connected to a transfer switching mechanism which continues the electrical path through integral overcurrent protectors associated with the transfer switching mechanism to supply power to certain selected circuits of the load center as determined by the transfer switching mechanism circuit breakers. The circuits of the transfer switching mechanism are wired to selected circuits of the load center through wiring housed within a conduit extending between the load center and the transfer switching mechanism.

The present invention relates to a power transfer switching mechanism for interposition between an auxiliary power source and electrical load center of a building. Such a switching mechanism typically includes a cabinet having a front panel which may be provided with an opening for accommodating power input structure, such as a socket-type power input receptacle. The power input receptacle may also be remotely mounted at a distance from the transfer mechanism and interconnected by cabling. The input receptacle is adapted to selectively receive a plug connector electrically interconnected with a source of auxiliary power such as a generator, and is interconnected with a bus bar within the cabinet. Overcurrent protectors are mounted to the bus bar for receiving power from the generator through the input receptacle to provide auxiliary power to selected circuits of the load center. A set of switches associated with the overcurrent protectors is mounted to the panel for controlling the supply of generator power from the switching mechanism to the building load center. A power outlet receptacle may also provided in the panel for selectively delivering generator power to a load plugged into the receptacle. A pair of watt meters may be further included in the panel for displaying the amount of power provided by the generator.

Certain or all of the switches associated with the overcurrent protectors on the panel of the power transfer switching mechanism are connected to a particular load such as a furnace blower, sump pump, refrigerator, light circuit, freezer or other device normally driven by a utility power source. With utility power available, each of the switches connected to a particular load is manually set to a LINE position. However, in the event of a power outage, once the generator is connected to the power transfer switching mechanism, the switches connected to the loads are manually set to a GENERATOR position to effect the actual transfer of power from the generator to the loads. If any of these switches were to be moved from their intended setting due to accidental or inadvertent contact, it would cause a cut off in power to the connected load(s). For example, if a child playing in the vicinity of the power transfer switching mechanism were to actually hit the switch which controls power to a freezer, it would result in the unplanned thawing of food which might not become immediately known such that the thawed food may need to be disposed of.

Accordingly, it would be desirable to provide the power transfer switching mechanism with a cover assembly which would prevent accidental or inadvertent contact with the switches on the panel of the power transfer switching mechanism so as to preserve the continuous transfer of power to selected loads. It would also be desirable to provide such a cover assembly which would permit easy access to the panel of the power transfer switching mechanism and simultaneously provide constant visual inspection of the components on the panel.

It is one object of the present invention to provide a power transfer switching mechanism equipped with a cover assembly for selectively permitting and preventing access to the front panel of the power transfer switching mechanism.

It is also an object of the present invention to provide a power transfer switching mechanism with a cover assembly which is easy to install and simple to operate.

It is a further object of the present invention to provide a power transfer switching mechanism having a hinged cover assembly which can be mounted on new equipment or retrofit on existing equipment.

It is another object of the present invention to provide a power transfer switching mechanism having a transparent cover assembly which enables unobstructed monitoring of the front panel of the power transfer switching mechanism when the cover is in a closed position overlying the front panel.

It is an additional object of the present invention to provide a power transfer switching mechanism having a cover assembly which ensures that a reliable connection between a power source and one or more loads is maintained without accidental contact with the switches on the front panel of the power transfer switching mechanism.

In one aspect of the invention, a power transfer arrangement is provided for supplying power from a generator to the electrical system of a building. The power transfer arrangement has a power transfer'switching mechanism adapted for interconnection with the building electrical system and includes a cabinet having panel structure provided with various electrical components for transferring power to various load circuits. The invention is improved by a transparent cover assembly movably mounted to the cabinet for selectively preventing and permitting access to the electrical components and the front panel while simultaneously allowing constant visual monitoring of the components of the panel structure. The electrical components of the power transfer switching mechanism include a set of switches mounted to the panel structure controlling the supply of power from the power transfer switching mechanism to the building electrical system. The transparent cover assembly is pivotally mounted about a horizontal axis to a top edge of the panel structure for movement between a closed position against the panel structure for preventing access to the electrical components, and an open position swung away from the panel structure for permitting access to the electrical components. The panel structure includes a front panel defining a mounting surface for the electrical components. The cabinet includes a base having a pair of side panels interconnected by a top panel and a rear panel. The preferred cover assembly includes a transparent front cover, a hinge arrangement attached to the front cover and a support bracket joining the hinge arrangement with the panel structure. The front cover includes a front wall integrally formed with a pair of side walls, the side walls having rear edges engagable with the front panel and exterior surfaces which are received inside interior surfaces of the side panels when the cover assembly is in the closed position. The hinge arrangement includes a first leaf and a second leaf interconnected with the first leaf by knuckle structure, and a horizontal pivot pin passing through the knuckle structure. The support bracket has a horizontal portion connected to one of the first and second leaves and a vertical portion attached to a mounting anchor depending from the panel structure. An alternative cover assembly includes a transparent front cover, and a combination, U-shaped hinge and support bracket pivotally joining the front cover to the panel structure. The front cover has a pair of side walls with upper edges formed with aligned holes, and the combination hinge and support bracket has cylindrical bosses which are pivotally received in the holes.

In another aspect of the invention, a power transfer arrangement is provided for supplying power from a generator to the electrical system of a building. The power transfer arrangement has a power transfer switching mechanism adapted for interconnection with the building electrical system and includes a cabinet having panel structure provided with various electrical components for transferring power to various load circuits. The invention is improved by a pre-assembled cover assembly having a transparent front cover and a hinge and support structure pivotally mounted relative to the cover, the hinge and support structure being mounted to the cabinet.

Various other objects, features and advantages of the invention will be made apparent from the following description taken together with the drawings.

BRIEF DESCRIPTION OF THE SEVERAL VIEWS OF THE DRAWINGS

The drawings illustrate the best mode presently contemplated of carrying out the invention.

In the drawings:

FIG. 1 is an isometric view showing the power transfer switching mechanism provided with a hinged, pre-assembled, transparent cover assembly constructed according to the invention;

FIG. 2 is an isometric, exploded view of the pre-assembled cover assembly relative to the switching mechanism shown in FIG. 1;

DETAILED DESCRIPTION OF THE INVENTION

Although not shown, a power supply arrangement interconnects a portable generator with a main electrical panel or load center located in the interior of a building. As is well known, the load center is equipped with a plurality of circuit breaker switches, each of which is associated with a particular load circuit for normally running a load such as a furnace blower, sump pump or other device from a utility power source. In such a power inlet arrangement, a manual power transfer switching mechanism 10 constructed in accordance with the invention is mounted adjacent the main panel, and is interconnected therewith via a series of wires enclosed in a conduit 12 extending between the main panel and the transfer switch 10. The general construction of the power transfer switching mechanism 10 may be such as manufactured by Reliance Controls Corporation of Racine, Wis. under the designation Gen/Switch (e.g. Model 30216 or any other satisfactory model).

Figure 4:
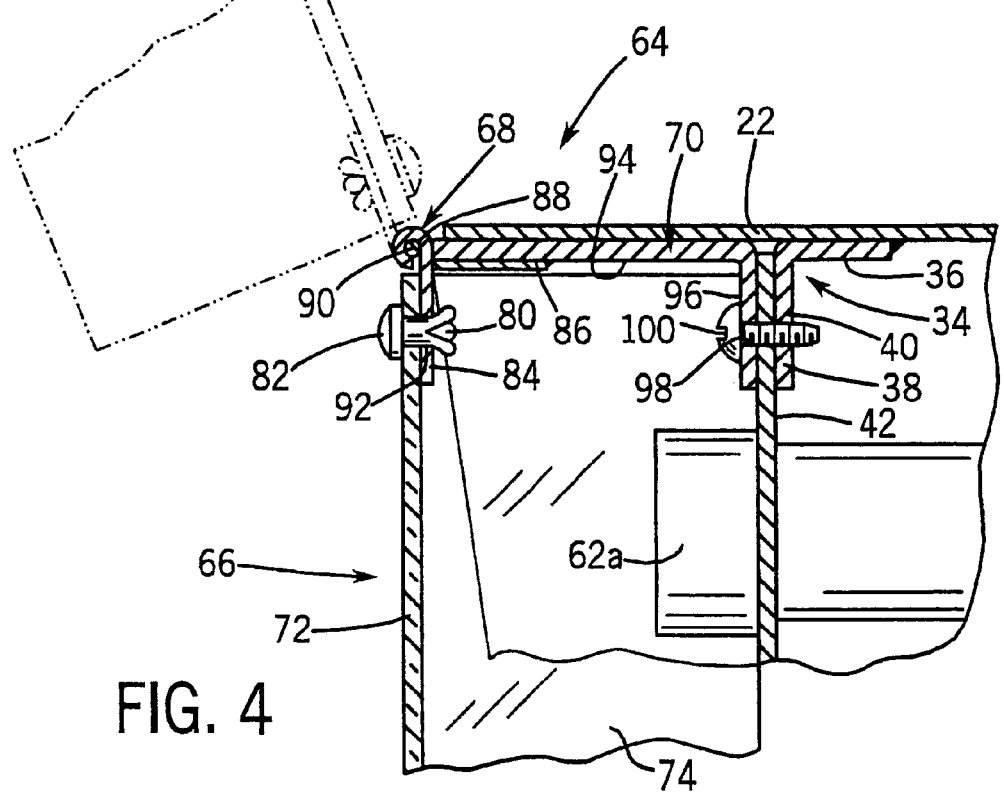
FIG. 4 is a partial, enlarged, sectional view of the installed cover assembly taken on line 4—4 of FIG. 1.

As seen in FIGS. 1 and 4, the power transfer switching mechanism 10 includes a cabinet having a base defined by a pair of parallel, upwardly diverging side panels 14, 16, each having an inwardly extending flange 18 with holes 20 formed therein at their lower ends. A top panel 22 extends between and interconnects the upper ends of the side panels 14, 16, and a rear panel 24 joins the side panels 14, 16 and the top panel 22 together. Running vertically along the exterior surface of the rear panel 24 is a pair of rigid metal straps 26, 28 formed with fastener holes 30 to facilitate mounting of the base to a building wall 32. The interior surface of the top panel 22 is provided with an L-shaped mounting anchor 34 having a rearwardly extending portion 36 joined, such as by welding, to a forward portion of the top panel interior surface, and a downwardly extending portion 38 formed with a pair of spaced apart, threaded cover mounting apertures 40.

The power transfer switching mechanism 10 also includes a front panel unit having a vertically extending front panel 42 integrally formed with a rearwardly extending bottom panel 44. The upper end of the front panel 42 is provided with two through holes 46 adapted to be aligned with the apertures 40 in the mounting anchor 34. The side edges of the bottom panel 44 are formed with a series of screw threaded openings 48 which are aligned with the holes 20 and the flanges 18 at the lower end of the side panels 14, 16. A set of screws 50 is passed through the holes 20 and screwed into the threaded openings 48 to hold the front panel unit together with the base. When the front panel 42 is secured to the base, a front portion of top panel 22 and the upper portions of side panels 14, 16 project forwardly of the plane of the front panel 42 as seen in FIGS. 2 and 4.

As is well known, the front panel 42 functions as a flat mounting surface for supporting various electrical components including a power output receptacle 52, a pair of watt meters 54, 56, a power input receptacle 58 and a linear array of identical adjacently disposed switches 60a–f. Also positioned on the front panel 42 and positioned above each of the switches 60a–f in association therewith is a respective, resettable overcurrent protective device 62a–f which corresponds to a particular load circuit. Power output receptacle 52 is selectively used in a plug type connection to deliver generator power, while watt meters are selectively employed to monitor generator power delivered to the electrical loads in the system. Power input receptacle 58 is also a plug type connection, also selectively employed, which enables generator power to be received in the cabinet and connected to all the other components mounted on the front panel 42. The power input receptacle may also be remotely mounted at a distance from the transfer mechanism and interconnected by cabling. In addition, switches 60a–f are employed to effect the actual transfer of power from the generator to various loads. For example, the first switch 60a may control power to a furnace blower, the second switch 60b may control power to a sump pump, the third switch 60c may control power to a refrigerator. Fourth, fifth and sixth switches, 60d–f may control power to a freezer, a light circuit, and an air conditioner, respectively. Overcurrent protective devices 62a–f protect individual circuits from an abnormality by breaking the circuit such as in the event of a current overload.

Each of the switches 60a–f on front panel 42 is of triple throw construction having a respective lever which is manually actuable to a LINE position when utility power is available, a GEN position when auxiliary or generator power replaces utility power and an OFF position which signifies no electrical power is being transferred to the load circuits. Switches 60a–f are designated such that each lever must move to the OFF position before being placed either in the GEN or LINE positions. Although not shown, in the case of double-pole circuits a tie bar interconnects two switches together.

Because the power transfer switching mechanism 10 and the setting of switches 60a–f is critical to preserving the transfer of either utility or generator power to the various load circuits, it is important to maintain the intended setting of the switch so as to avoid any power cut off such as to appliances defining the load.

In accordance with the invention, the power transfer switching mechanism 10 includes a pre-assembled, transparent cover assembly 64 which selectively prevents and permits access to the electrical components on the front panel 42 and, in particular, the switches 60a–f movably mounted thereon. At the same time, the cover assembly 64 provides complete and constant visual inspection of the components on the front panel 42. Cover assembly 64 is hingedly or pivotally mounted about a horizontal axis to the top edge of the front panel 42 for movement between a closed position (FIGS. 1 and 4) and an open position (shown in phantom lines at FIG. 4).

Figure 3:
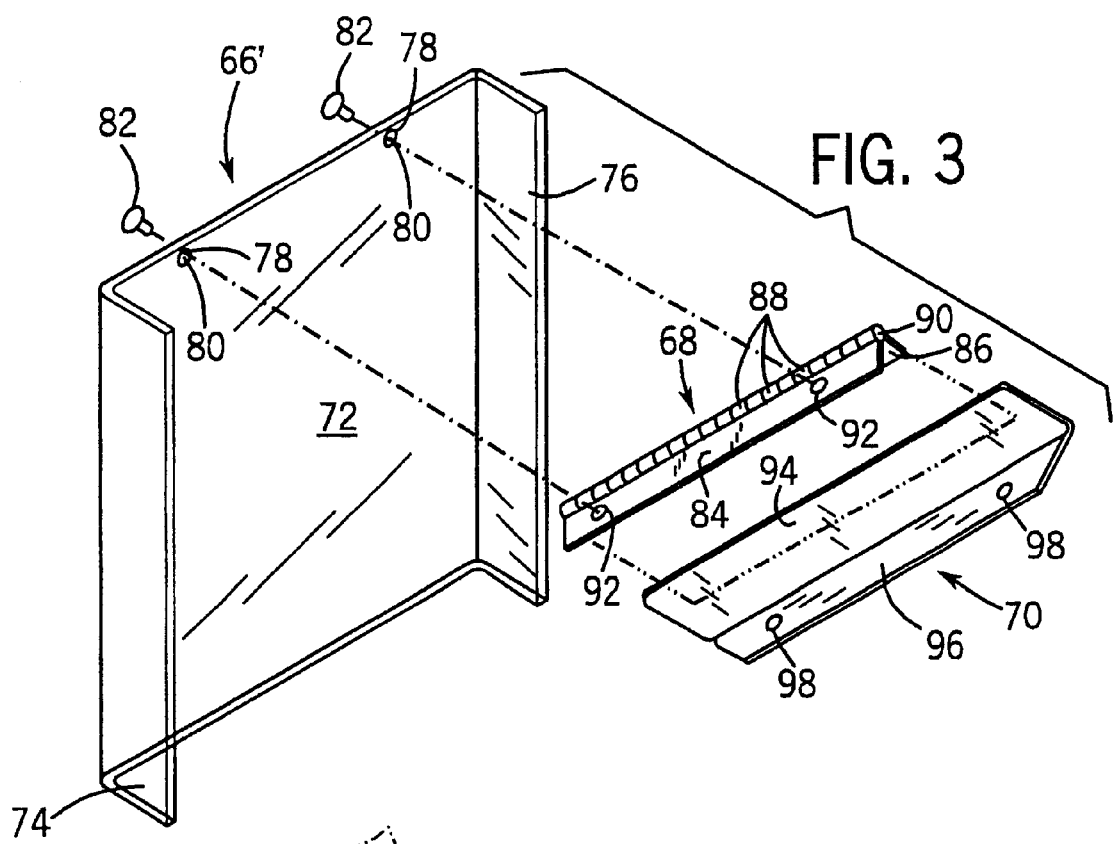
FIG. 3 is an isometric, exploded view of the individual components of the cover assembly.

Referring to FIG. 3, cover assembly 64 is typically comprised mainly of three elements, namely, a transparent cover 66 preferably formed of extremely durable plastic, a hinge arrangement preferably formed of metal, and a support bracket 70 also preferably fabricated from metal.

Cover 66 has a planar front wall 72 integrally formed with rearwardly extending side walls 74, 76, the rear edges of which engage the front panel 42 and the planar surfaces of which side walls 74, 76 are adapted to be positioned inside the interior surfaces of the side panels 14, 16 when the cover assembly 64 is in the closed position. The height of the cover front wall 72 and the side walls 74, 76 is substantially coextensive with the height of the front panel 42. The front wall 72 is formed with two apertures 78 spaced apart along the top edge thereof to facilitate mounting of the cover assembly 64 to the mounting anchor 34 depending from the top panel 22. Each of these apertures 78 is friction fit with a plastic receiver 80 which accommodates a headed plastic fastener 82 in a pop-in fit.

Hinge arrangement 68 includes a first leaf 84 and a second leaf 86, each of which has a series of interlocking knuckles 88 through which an elongated hinge pin 90 is passed. The first leaf 84 is formed with a pair of openings 92 aligned with apertures 78 in the cover front wall 72 so that the receivers 80 are frictionally held in the openings 92 and the apertures 78 is best seen in FIG. 4.

Support bracket 70 is a generally L-shaped bracket having a horizontal segment 94 integrally formed with a vertical segment 96 having spaced apart holes 98 aligned with the through holes 46 in the top edge of the front panel 42 and the threaded apertures 40 in the mounting anchor 34. A pair of screws 100 are used to fasten the support brackets 70 against the top of the front panel 42 and to the mounting anchor 34. The front of the horizontal segment 94 is slightly recessed as shown in FIG. 4 to receive the knuckles 86 and hinge pin 90 of the hinge arrangement 68. Further, the upper surface of the second leaf 86 is fixed, such as by spot welding, to a lower surface of the horizontal portion 94 of the support bracket 70.

With the cover assembly 64 hingedly mounted to the power transfer switching mechanism 10 in the closed position, the front wall 72 of cover 66 is spaced forwardly of the switches 60a–f on the front panel 42 and the cover 66 is open at the bottom. In the closed position, the setting of the switches 60a–f cannot be accidentally or inadvertently bumped as could be the case without the cover assembly 64. That is, with the cover assembly 64, a switch 60d associated with a freezer circuit, for example, will remain in a position transferring power to keep the freezer running. Without the cover 66, bumping of the switch 60d associated with the freezer could lead to a shut off of power resulting in the unwanted and likely unknown thawing of food. The pre-assembled cover assembly 64 can be attached to new power transfer switching mechanisms 10 or can be easily retrofit to existing power transfer switching mechanisms simply by using the through holes 46 in the front panel 42 and the threaded apertures 40 in the mounting anchor 34 along with the two screws 100. When it is desired to engage the switches 60a–f or other components on the front panel 42, the cover 66 is simply pivoted upward to allow complete, unobstructed access to the front panel 42. It should be appreciated that because of the transparent cover 66, the front panel 42 is able to be constantly visually monitored especially when in the closed position.

Figure 5:
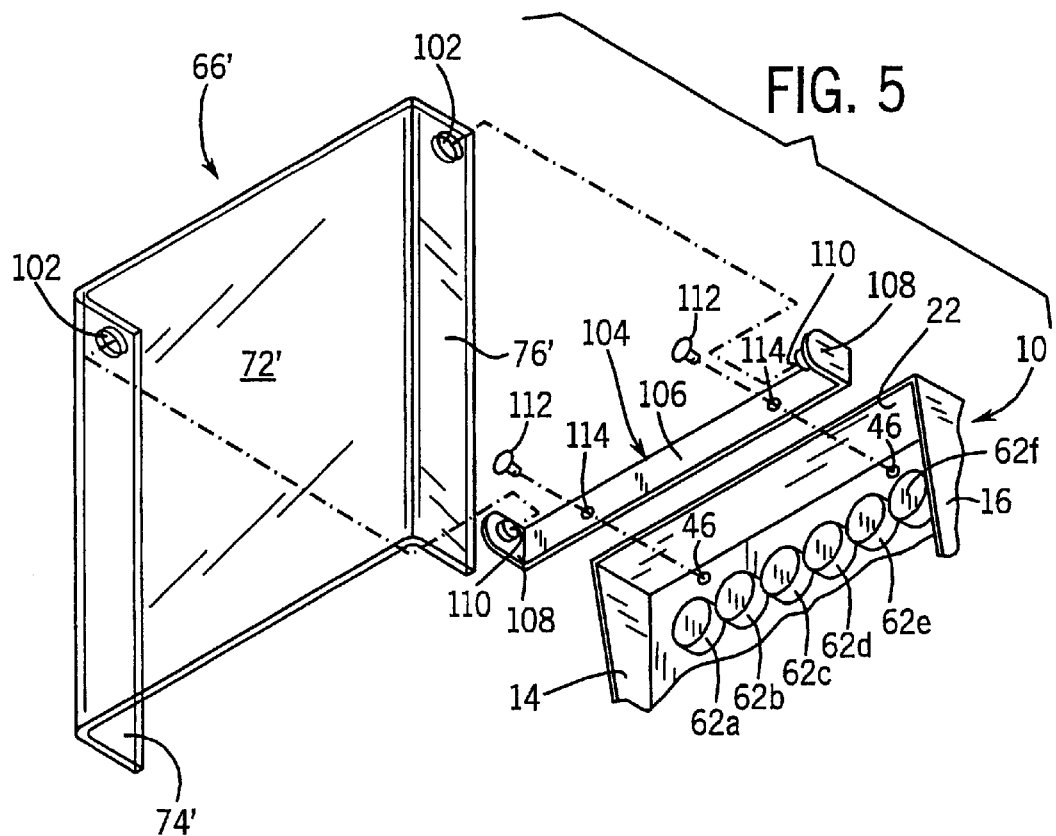
FIG. 5 is an exploded view like FIG. 3 showing an alternative cover assembly for the power transfer switching mechanism.
Figure 6:
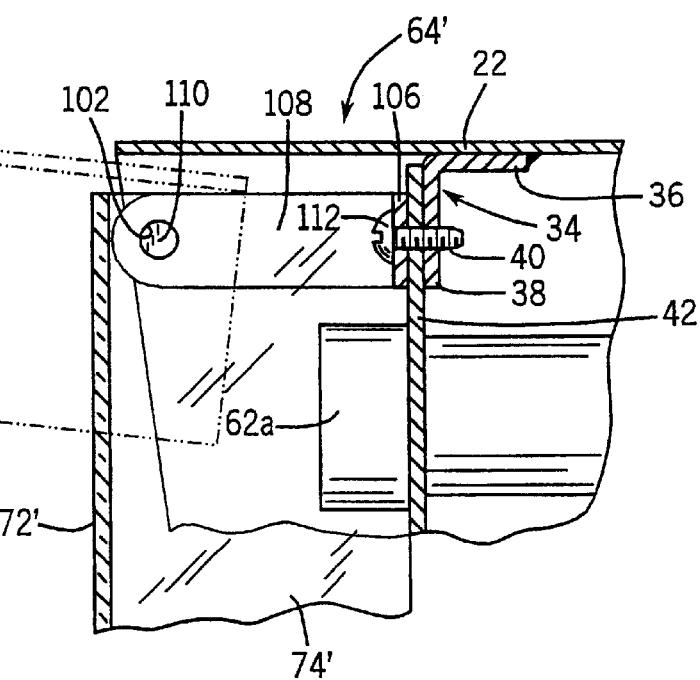
FIG. 6 is a sectional view similar to FIG. 4 of the alternative cover assembly shown in FIG. 5.

FIGS. 5 and 6 illustrate an alternative embodiment of the transparent cover assembly 64'. In this version, the front cover 66' is formed with a pair of aligned holes 102 at the top of the side walls 74', 76'. In addition, the cover assembly 64' includes a generally U-shaped, combination hinge and support bracket 104 having a base strip 106 integrally formed with a pair of forwardly projecting ears 108, each of which includes an inwardly extending, cylindrical hinge boss 110. Each boss 110 is designed to snap fit into one of the holes 102 in the front cover side wall 74', 76' so that the cover 66' may freely pivot relative to the base strip 106. The pre-assembled cover assembly 64' is attached to the top edge of the front panel 42 by passing fasteners 112 through a pair of spaced through holes 114 on the base strip 106 and threading the fasteners 112 into engagement with the threaded apertures 40 on the mounting anchor 34 depending from the cabinet top panel 22.

It should be appreciated that the present invention provides a hinged transparent cover assembly 64, 64', for a power transfer switching mechanism 10 which ensures that a reliable connection between the power source and one or more loads is maintained without accidental contact with the switches 60a–f on the front panel 42 of the power transfer-switching mechanism 10. The cover assembly 64, 64', is simple in construction, low in cost and easy to install and operate. The cover assembly 64, 64', allows the front panel 42 to be viewed at all times and can be conveniently installed on both new and old power transfer switching mechanisms.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

I claim:

1. In a power transfer arrangement for supplying power from a generator to the electrical system of a building, the power transfer arrangement having a power transfer switching mechanism adapted for interconnection with the building electrical system and including a cabinet having panel structure provided with various electrical components for transferring power to various load circuits, the improvement comprising:

a transparent cover assembly movably mounted to the cabinet for selectively preventing and permitting access to the electrical components and the front panel while simultaneously allowing constant visual monitoring of the components of the panel structure, wherein the cover assembly includes a transparent front covered a hinge arrangement attached to the front cover and a support bracket joining the hinge arrangement with the panel structure, and wherein the front cover includes a front wall integrally formed with a pair of side walls, the side walls having rear edges engagable with the front panel, and exterior surfaces which are received inside interior surfaces of the side panels when the cover assembly is in the closed position.

2. The improvement of claim 1, wherein the electrical components of the power transfer switching mechanism include a set of switches mounted to the panel structure for controlling the supply of power from the power transfer switching mechanism to the building electrical system.

3. The improvement of claim 1, where in the transparent cover assembly is pivotally mounted about a horizontal axis to a top edge of the panel structure for movement between a closed position against a panel structure for preventing access to the electrical components, and an open position swung away from the panel structure for permitting access to the electrical components.

4. The improvement of claim 3, wherein the panel structure includes a front panel defining a mounting surface for the electrical components.

5. The improvement of claim 4, wherein the cabinet includes a base having a pair of side panels interconnected by a top panel and the rear panel.

6. The improvement of claim 1, wherein the hinge arrangement includes a first leaf and a second leaf interconnected with the first leaf by knuckle structure, and a horizontal pivot pin passing through the knuckle structure.

7. The improvement of claim 6, wherein the support bracket has a horizontal portion connected to one of the first and second leafs, and a vertical portion attached to a mounting anchor depending from the panel structure.

8. The improvement of claim 1, wherein the cover assembly includes a transparent front cover, and a combination, U-shaped hinge and support bracket pivotally joining the front cover panel structure.

9. The improvement of claim 8, wherein the front cover has a pair of side walls with upper edges formed with aligned holes, and the combination hinge and support bracket has cylindrical bosses which are pivotally received in the holes.

* * * * *